USO12008156B2

(12) United States Patent
Karri et al.

(10) Patent No.: US 12,008,156 B2
(45) Date of Patent: Jun. 11, 2024

(54) DETERMINING CONTENT VALUES TO RENDER IN A COMPUTER USER INTERFACE BASED ON USER FEEDBACK AND INFORMATION

(71) Applicant: International Business Machines Corporation, Armonk, NY (US)

(72) Inventors: Venkata Vara Prasad Karri, Visakhapatnam (IN); Shailendra Moyal, Pune (IN); Akash U. Dhoot, Pune (IN)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 16/129,598

(22) Filed: Sep. 12, 2018

(65) Prior Publication Data

US 2020/0081591 A1    Mar. 12, 2020

(51) Int. Cl.
*G06F 3/048* (2013.01)
*G06F 3/01* (2006.01)
(Continued)

(52) U.S. Cl.
CPC ............ *G06F 3/013* (2013.01); *G06F 3/0483* (2013.01); *G06F 18/214* (2023.01); *G06N 20/00* (2019.01);
(Continued)

(58) Field of Classification Search
CPC ................. G06F 16/93; G06F 3/04842; G06F 16/24578; G06F 16/951; G06F 16/9577;
(Continued)

(56) References Cited

U.S. PATENT DOCUMENTS 8,676,717 B2    3/2014  Tigali et al.
9,516,380 B2 *  12/2016 Benea .............. H04N 21/44008
(Continued)

FOREIGN PATENT DOCUMENTS

EP    1640878 A1 *  9/2004 ......... G06F 16/9577

OTHER PUBLICATIONS

Jason Plank, Is it possible to have a linked list of different data types?, 2009-2015, Stackoverflow, https://stackoverflow.com/questions/1131313/is-it-possible-to-have-a-linked-list-of-different-data-types (Year: 2015).*

(Continued)

*Primary Examiner* — Mohamed Abou El Seoud
(74) *Attorney, Agent, or Firm* — Konrad, Raynes, Davda & Victor LLP; David W. Victor (57) ABSTRACT

Provided are a computer program product, system, and method for determining content values to render in a computer user interface based on user feedback and information. Detection is made of a section of the document rendered in a computer user interface that the user is observing. A monitoring device detects user biometric data in response to detecting the section the user is observing. Input is provided to a machine learning module comprising the content value in the section the user is observing, the user biometric data, and personal information of the user. Output from the machine learning module indicates a likelihood that the user approved or disapproved of the content value in the section the user was observing. The output is used to determine whether to send a substitute content value of the plurality of content values to render in the section the user is observing.

16 Claims, 8 Drawing Sheets

(51) Int. Cl.
*G06F 3/0483* (2013.01)
*G06F 18/214* (2023.01)
*G06N 20/00* (2019.01)
*G06V 10/764* (2022.01)
*G06V 10/778* (2022.01)
*G06V 10/82* (2022.01)
*G06V 40/16* (2022.01)
*G06V 40/19* (2022.01)
*G06V 40/10* (2022.01)

(52) U.S. Cl.
CPC ........ *G06V 10/764* (2022.01); *G06V 10/7784* (2022.01); *G06V 10/82* (2022.01); *G06V 40/174* (2022.01); *G06V 40/19* (2022.01); *G06V 40/15* (2022.01)

(58) Field of Classification Search
CPC ........ G06F 9/451; G06F 3/0483; G06F 3/013; G06F 3/011; G06F 3/0304; G06F 2203/011; G06F 18/214; G06N 20/00; G06N 3/0454; G06N 20/20; G06N 3/084; G06N 3/045; G06K 9/00302; G06K 9/6256; G06K 9/6263; G06K 9/6272; G06K 9/00604; G06K 2009/00939; G06V 40/174; G06V 10/82; G06V 40/19; G06V 40/15; G06V 10/764; G06V 10/7784
See application file for complete search history.

(56) References Cited

U.S. PATENT DOCUMENTS

| | | | | |
|---|---|---|---|---|
| 10,049,664 | B1* | 8/2018 | Indyk | H04L 67/327 |
| 10,095,740 | B2* | 10/2018 | Bastide | G06F 16/24542 |
| 10,360,254 | B1* | 7/2019 | Knas | G06F 3/013 |
| 2002/0193066 | A1* | 12/2002 | Connelly | H04H 60/06 |
| | | | | 455/2.01 |
| 2009/0088610 | A1* | 4/2009 | Lee | A61B 5/6814 |
| | | | | 600/301 |
| 2010/0198697 | A1* | 8/2010 | Brown | G06Q 30/02 |
| | | | | 705/14.73 |
| 2012/0290520 | A1* | 11/2012 | Frank | G06F 3/013 |
| | | | | 706/45 |
| 2013/0246926 | A1* | 9/2013 | Vemireddy | G06F 16/9535 |
| | | | | 715/738 |
| 2014/0026156 | A1* | 1/2014 | Deephanphongs | H04N 21/4223 |
| | | | | 725/12 |
| 2014/0130076 | A1* | 5/2014 | Moore | H04N 21/25883 |
| | | | | 725/19 |
| 2014/0143164 | A1 | 5/2014 | Posse et al. | |
| 2014/0181634 | A1* | 6/2014 | Compain | G06F 40/166 |
| | | | | 715/234 |
| 2014/0278308 | A1* | 9/2014 | Liu | H04L 67/22 |
| | | | | 703/6 |
| 2014/0280214 | A1* | 9/2014 | Han | G06F 16/90 |
| | | | | 707/748 |
| 2014/0280554 | A1* | 9/2014 | Webb | H04L 67/22 |
| | | | | 709/204 |
| 2015/0309569 | A1* | 10/2015 | Kohlhoff | G06F 3/013 |
| | | | | 345/156 |
| 2016/0226989 | A1* | 8/2016 | Ovsiankin | G06F 16/24575 |
| 2016/0292744 | A1* | 10/2016 | Strimaitis | G06Q 30/0269 |
| 2016/0342692 | A1* | 11/2016 | Bennett | G06F 16/9535 |

OTHER PUBLICATIONS

Uj, A., "Predicting Human Behavior with Deep Learning", May 30, 2018, © 2017 Stravium Intelligence LLP, Total 3 pp.

SAS, "Deep Learning What it is and why it matters", [online], [Retrieved on Sep. 11, 2018]. Retrieved from the Internet at <URL: https://www.sas.com/en_au/insights/analytics/deep-learning.html>, Total 8 pp.

Kar, A. et al., "A Review and Analysis of Eye-Gaze Estimation Systems, Algorithms and Performance Evaluation Methods in Consumer Platforms", Submitted revised manuscript on Jun. 21, 2017 to IEEE Access for review. Accepted on Jul. 24, 2017, Accepted for Publication in IEEE Access. DOI 10.1109/ACCESS.2017.2735633, Total 25 pp.

Tsai et al., "Predicting Job Offer Acceptance of Professionals in Taiwan: The Case of the Technology Industry", Technological Forecasting and Social Change, v 108, p. 95-101, Jul. 1, 2016; ISSN: 00401625; DOI: 10.1016/j.techfore.2016.05.005; Publisher: Elsevier Inc., Total 1 p.

"Real-time video analysis with the Emotion API | Microsoft Docs", [online], [Retrieved on Aug. 12, 2018], Jan. 24, 2017. Retrieved from the Internet at <URL: https://docs.microsoft.com/en-us/azure/cognitive-services/emotion/emotion-api-how-to-topics/howtoanalyzevideo_emotion>, Total 1 p.

* cited by examiner

FIG. 1

User Reaction Data

FIG. 2

User Entry

FIG. 3

Section Entry

FIG. 4

Input to Machine Learning Module

DETERMINING CONTENT VALUES TO RENDER IN A COMPUTER USER INTERFACE BASED ON USER FEEDBACK AND INFORMATION

BACKGROUND OF THE INVENTION

1. Field of the Invention

The present invention relates to a computer program product, system, and method for determining content values to render in a computer user interface based on user feedback and information.

2. Description of the Related Art

A user may be provided a document to review in a computer user interface intended to convince the user to take a course of action, such as purchase a product, accept a job offer, express approval for the content being viewed, etc. In current situations, the producer of the document needs to rely on feedback the user volunteers to provide about the document as a whole, and the feedback may not be specific as to which sections of the document and terms were acceptable or disagreeable. This may arise whether the user is reviewing a document in paper format or on a computer monitor, and in many cases the user may not bother providing useful feedback or suggestions that could assist the document producer in improving the document to achieve the desired result.

There is a need in the art to provide improved techniques to ascertain a user's cognitive perception, such as disapproval and approval, of content the user is viewing in a computer user interface to determine how to improve the presentation of information to a user to achieve a desired result.

SUMMARY

Provided are a computer program product, system, and method for determining content values to render in a computer user interface based on user feedback and information. Detection is made of a section of the document rendered in a computer user interface that the user is observing in which a content value is rendered comprising one of a plurality of content values for the section. A monitoring device detects user biometric data in response to detecting the section the user is observing. Personal information of the user is determined Input is provided to a machine learning module comprising the content value in the section the user is observing, the user biometric data, and the personal information of the user. Output from the machine learning module is received indicating likelihood that the user approved or disapproved of the content value in the section the user was observing. The output is used to determine whether to send to the computer user interface a substitute content value of the plurality of content values to render in the section the user is observing.

DETAILED DESCRIPTION

To improve targeting of content to users, described embodiments provide techniques to objectively ascertain user approval or disapproval of the targeted content. Oftentimes, honest user opinions on the content are difficult to obtain. For instance, if the targeted content comprises a product offer or other type of agreement or offer, the user may not be forthcoming on their approval of terms to try to obtain even better terms beyond what they would otherwise accept. Further, a user may be unwilling to dedicate the time to cooperate with a content producer to provide detailed information on what portions of the rendered content they approved or disapproved.

Described embodiments address the above issues in ascertaining real-time user cognitive processes and intentions by obtaining objective real-time feedback from the user while viewing specific sections of content in a computer user interface that does not rely on user comments and instead relies on more objective criteria, such as user reactions to the content while viewing. With the described embodiments, a section of the document rendered in a computer user interface that the user is observing in which a content value is rendered, comprising one of a plurality of content values for the section, is detected. A monitoring device detects user biometric data in response to detecting the section the user is observing. Input comprising the content value in the section the user is observing, the detected user biometric data, and personal information of the user is provided to a machine learning module to produce output indicating a likelihood that the user approved or disapproved of the content value in the section the user was observing. The output is used to determine whether to send to the computer user interface a substitute content value of the plurality of content values to render in the section the user is observing.

Figure 1:
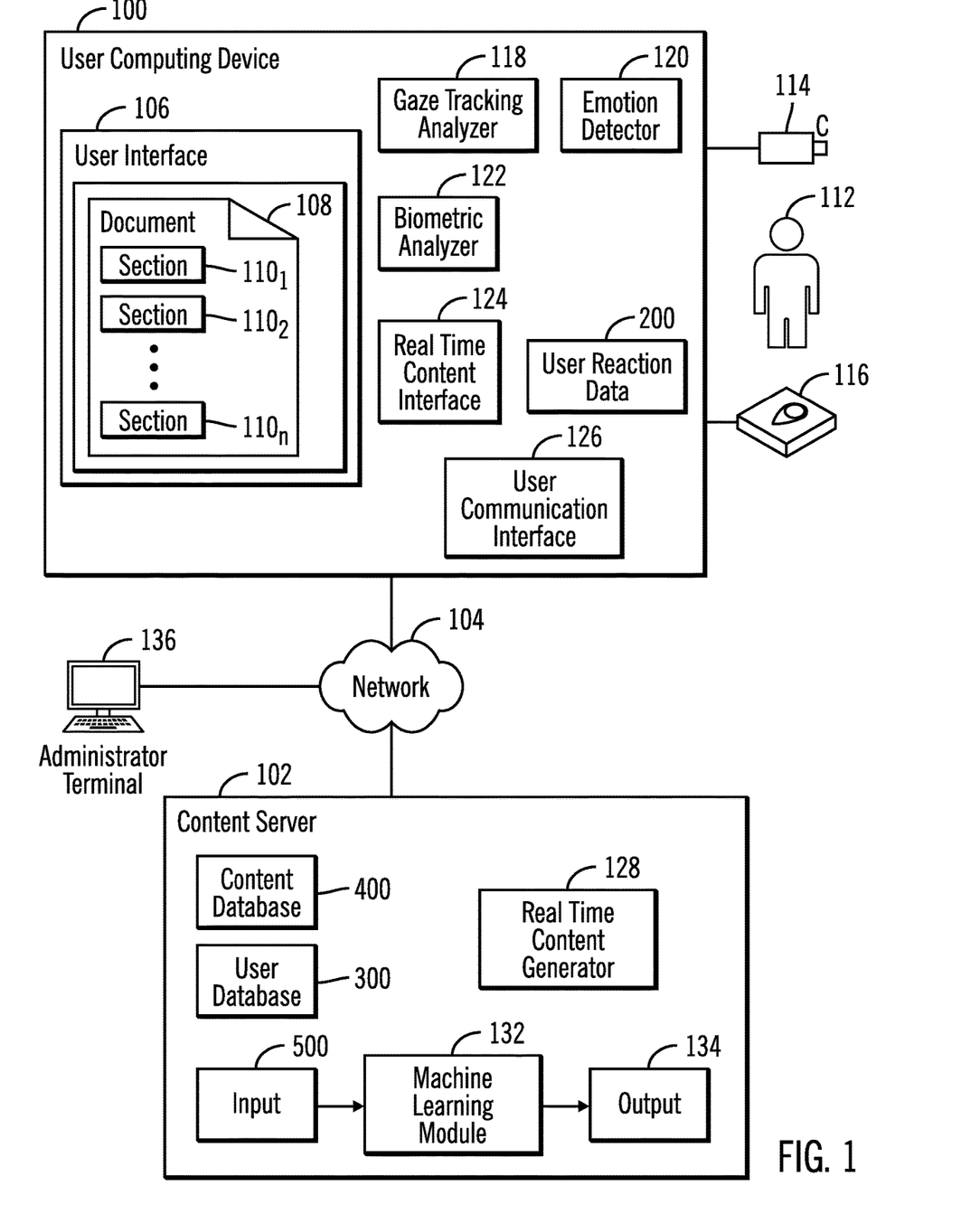
FIG. 1 illustrates an embodiment of a computing environment to provide a user a document having variable content to review.

FIG. 1 illustrates an embodiment of a user computing device 100 in communication with a content server 102 over a network 104. The user computing device 100 renders a user interface 106, such as on a display screen, that renders a document 108 including a plurality of sections $110_1$, $110_2 \ldots 110_n$, where each section renders one of a plurality of content values provided for the section. The document 108 including the specific content values for the sections $110_1, 110_2 \ldots 110_n$ may be provided by the content server for a user 112 of the computing device 100. The user computing device 100 may be coupled to a video camera 114, internal or external to the user computing device 100, to capture video or still images of the user 112 face and optionally a biometric device 116 to capture biometric data from the user, such as heart rate, perspiration, body movement, etc. The user computing device 100 includes program components comprising: a gaze tracking analyzer 118 to determine from the video camera 114 a location in the document 108 at which the user 112 eyes are gazing; an emotion detector 120 to determine from the video camera 114 an emotion of the user 112 based on an image of the user 112 facial expressions; a biometric analyzer 122 to analyze biometric data read from the biometric device 116; a real-time content interface 124 to generate user reaction data 200 including information on a content value in a section $110_i$ on which the user is gazing, user emotions, and biometric data to return to the content server 102 for analysis; and a user communication interface 126 to open a communication channel, such as a chat program, with an administrator, such as a document administrator or support personnel, at the administrator computer 136.

In certain embodiments, the gaze tracking system may in addition to the video camera 114 use light emitting diodes (LED) to produce glints on the eye cornea surface, as part of Pupil Center Corneal Reflection, and then capture the images of the eye region to estimate what the user 112 is gazing in the document 108. Other gaze tracking devices and techniques may be used. In an alternative embodiment, the gaze tracking device may comprise user wearable glasses. The emotion detector 120 may comprise the International Business Machine Corporation (IBM) Watson Visual Recognition, the Emotion API by Microsoft Corporation or other similar software to analyze emotions from facial expressions in captured images.

The document 108 may comprise a page of content, such as an application page, Hypertext Markup Language (HTML) page, Extended Markup Language (XML) page, word processor page, etc.

The content server 102 includes a real-time content generator 128 to process the user reaction data 200 with respect to a content value in a section $110_i$ of the document 108; a user database 300 having information on users 112 that receive documents 108 from the content server 102; a content database 400 having information on content values for sections that may be included in a document 108, such that each section may include one of a plurality of different content values for a type of information to include in the document 108; and a machine learning module 132 that receives as input 500 user reaction data 200 for a content value and user personal information from the user database 300 and computes as output 134 a likelihood the user 112 gazing at the section would approve or disapprove of the content value rendered in the section $110_i$.

The machine learning module 132 implements a machine learning technique such as decision tree learning, association rule learning, artificial neural network, inductive programming logic, support vector machines, Bayesian models, etc. The real-time content generator 128 uses the outputted 134 likelihood of approval or disapproval to determine whether to supply a different content value for the section $110_i$ for which the user reaction data 200 was received. The arrows shown from the input 500 to the machine learning module 132 and to the output 134 illustrate a flow of data to and from the machine learning module 132 and not actual structures in a memory of the content server 102.

There may be one or more administrator computer terminals 136 to allow a document administrator, such as document support personnel. to interact with the user 112 at the user computing device 100 as to the content being distributed in the document 108.

In one embodiment, the machine learning module 132 may comprise artificial neural network programs. Each neural network may be trained using backward propagation to adjust weights and biases at nodes in a hidden layer to produce the likelihood of user approval or disapproval of rendered content value in a section $110_i$. In backward propagation, a determined actual user approval or disapproval of a content value for a section $110_i$ is used to train a neural network machine learning module to produce the actual user approval or disapproval based on the user reaction data 200 and user personal information, and biases at nodes in the hidden layer are adjusted accordingly to produce a reported actual user 112 approval or disapproval of a content value. Backward propagation may comprise an algorithm for supervised learning of artificial neural networks using gradient descent. Given an artificial neural network and an error function, the method may calculate the gradient of the error function with respect to the neural network's weights and biases.

Although FIG. 1 shows one machine learning module 132, there may be separate machine learning modules 132 for each section $110_i$ or one machine learning module for all the sections that may be included in a document 108.

Generally, program modules, such as the program components 106, 118, 120, 122, 124, 126, 128, and 132 may comprise routines, programs, objects, components, logic, data structures, and so on that perform particular tasks or implement particular abstract data types. The program components and hardware devices of the computing devices 100 and 102 of FIG. 1 may be implemented in one or more computer systems, where if they are implemented in multiple computer systems, then the computer systems may communicate over a network.

The program components 106, 118, 120, 122, 124, 126, 128, and 132 may be accessed by a processor from memory to execute. Alternatively, some or all of the program components 106, 118, 120, 122, 124, 126, 128, and 132 may be implemented in separate hardware devices, such as Application Specific Integrated Circuit (ASIC) hardware devices.

The functions described as performed by the program 106, 118, 120, 122, 124, 126, 128, and 132 may be implemented as program code in fewer program modules than shown or implemented as program code throughout a greater number of program modules than shown.

The program components described as implemented in the content server 102, such as 128, 132, 200, 300 may be implemented in the user computing device 100. Alternatively, components, e.g., 118, 120, 122, 124, described as implemented in the user computing device 100 may be implemented in the content server 102.

The user computing device 100 may comprise a personal computing device, such as a laptop, desktop computer, tablet, smartphone, etc. The content server 102 may comprise one or more server class computing devices, or other suitable computing devices.

Figure 2:
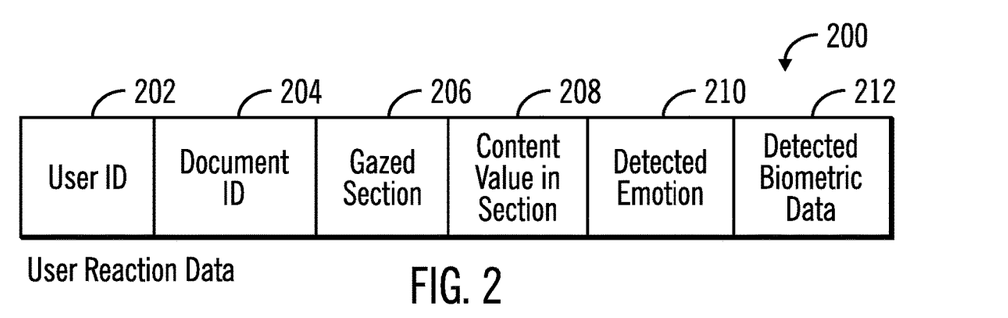
FIG. 2 illustrates an embodiment of user reaction data based on monitoring user responses to reviewing content in a document.

FIG. 2 illustrates an embodiment of the generated user reaction data 200 from the real-time content interface 124 and includes: a user identifier (ID) 202 of the user 112; a document ID 204 of the document 108 rendered in the user interface 106; a gazed section 206 comprising a section $110_i$ that the user is gazing as determined by the gaze tracking analyzer 118; a content value 208 rendered in the gazed section 206; a detected emotion 210 from the emotion detector 120; and detected biometric data 212 from the biometric device 116.

Figure 3:
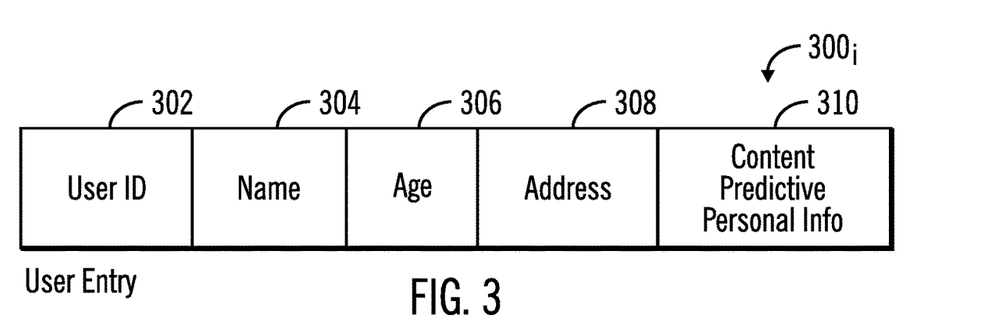
FIG. 3 illustrates an embodiment of a user entry in a user database having personal information on users reviewing documents.

FIG. 3 illustrates an embodiment of a user entry $300_i$ in the user database 300 having personal information for a user, including: a user ID 302; a name 304, age 306, and address 308 of the user, as well as content predictive personal information 310. The content predictive personal information 310 comprises user personal information that may have been deemed to have predictive qualities or correlation to the user decision to approve or disapprove of particular content values rendered in the sections $110_i$. For instance, if the document 108 concerns product advertisement for a user, then the content predictive personal information 310 may comprise purchase history, income level, education level, etc. If the document 108 comprises a type of offer for employment, consultancy or other type of offer, then the content predictive personal information 310 may comprise previous job positions, education level, previous salary, distance to work, transportation preference, benefit preferences, educational goals, etc., and any other factor that has predictive qualities with respect to the content values.

Figure 4:
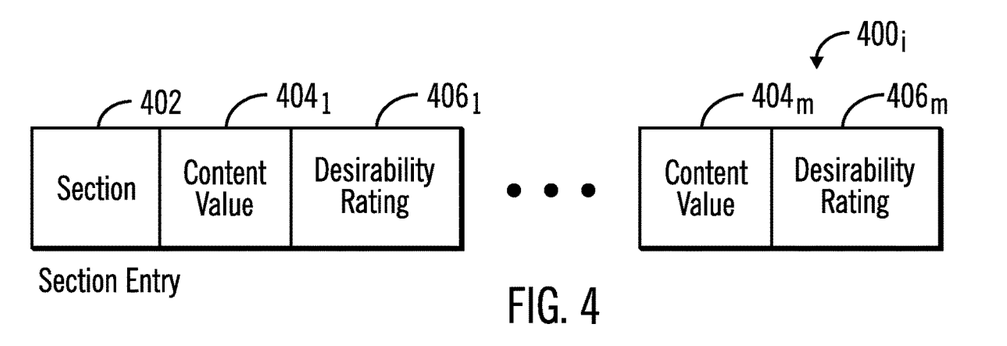
FIG. 4 illustrates an embodiment of a section entry having information on a section rendered in the document including different content values that may be presented in the section.

FIG. 4 illustrates an embodiment of a section entry 400, in the content database 400 providing possible content values for a section 402 to be rendered in a document 108, including multiple content values $404_1 \ldots 404_m$ and for each content value a corresponding user desirability rating $406_1 \ldots 406_m$ of the content value from the user 112 perspective. For instance, if the sections comprise product offerings, then for a section having price content, lower price values would have greater desirability ratings for the user/purchaser than higher prices. If the sections $110_i$ concern terms for an offer for employment, then content values related to a higher level of benefits for a section, e.g., pay, vacation days, pension contributions, stipends, etc., would have a higher desirability than a lower level of benefits.

Figure 5:
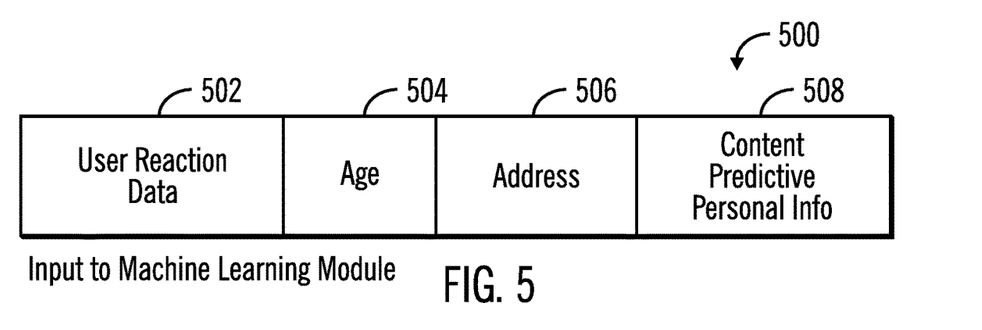
FIG. 5 illustrates an embodiment of input provided to a machine learning module used to determine whether a user approves or disapproves of content being viewed in the document.

FIG. 5 illustrates an embodiment of the input 500 to the machine learning module 132, and includes user reaction data 502, such as some or all the user information in user reaction data 200, age 504, address 506, and any other content predictive personal information 508 that has a likelihood of predicting or a high correlation with a content value of a plurality of content values the user would approve of for the gazed section 206.

Figure 6:
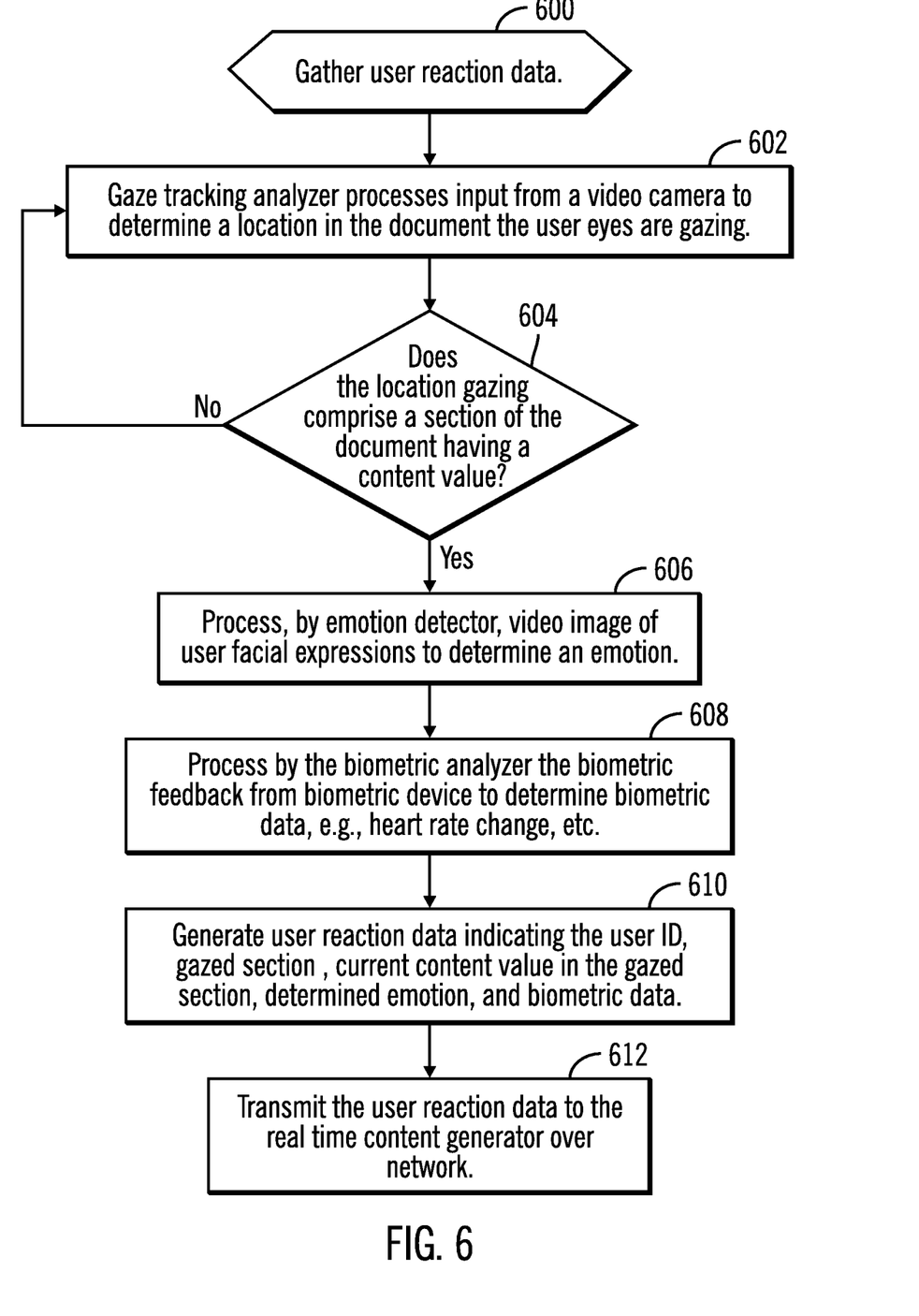
FIG. 6 illustrates an embodiment of operations to gather user reaction data for a user gazing a section of the document.

FIG. 6 illustrates an embodiment of operations performed by the real-time content interface 124 at the user computing device 100 to generate the user reaction data 200 based on content in the document 108 the user 112 is viewing. Upon initiating (at block 600) the gathering of the user reaction data 200, the real-time content interface 124 may invoke the gaze tracking analyzer 118 to process (at block 602) input from the video (or still) camera 114 to determine a location in the document the user 112 eyes are gazing. If (at block 604) the location at which the user is gazing comprises a section $110_i$ of the document 108 having a content value, then the real-time content interface 124 may invoke the emotion detector 120 to process (at block 606) the video or still images of the user facial expressions to classify the facial expressions as an emotion of the user 112. The real-time content interface 124 may further invoke a biometric analyzer 122 to process (at block 608) the biometric feedback from the biometric device 116 to determine biometric data, such as heart rate change, blood pressure changes, perspiration changes, etc. The real-time content interface 124 generates (at block 610) user reaction data 200 indicating the user ID 202, the document ID 204, the gazed section 206 determined by the gaze tracking analyzer 118, the content value 208 in the gazed section, the emotion 210 detected by the emotion detector 120, and the biometric data 212 detected by the biometric analyzer 122, and transmits (at block 612) the gathered user reaction data 200 to the content server 102 over the network 104. If (at block 604) the location the user 112 is gazing does not comprise a section $110_i$ having variable content, then control returns to block 602 to continue monitoring where the user 112 is gazing in the document 108 until the user is gazing at a location comprising a section $110_i$ of a variable content value. In an alternative embodiment where the real-time content generator 128 is located in the user computing device 100, the real-time content interface 124 may transfer the user reaction data 200 through an Application Program Interface (API) call within a same memory.

In certain embodiments, the user computing device 100 may be connected to a video camera 114, and other gaze tracking system elements, such as LEDs, but not a biometric device 116. In such case, the biometric data may comprise the detected user emotion. In further embodiments, there may be multiple biometric devices to detect different types of biometric data from the user 112.

With the embodiment of FIG. 6, the real-time content interface 124 gathers measured user reactions to a section $110_i$ having one of a plurality of content values that may indicate the user approval or disapproval of the particular content value rendered in the gazed section $110_i$ of the document 108 for analysis by the machine learning module 132. This allows gathering of user reaction data 200 that is objective and not susceptible to user intentional or subconscious subterfuge and deception as to their real subjective feelings and opinion on the rendered content value.

Figure 7:
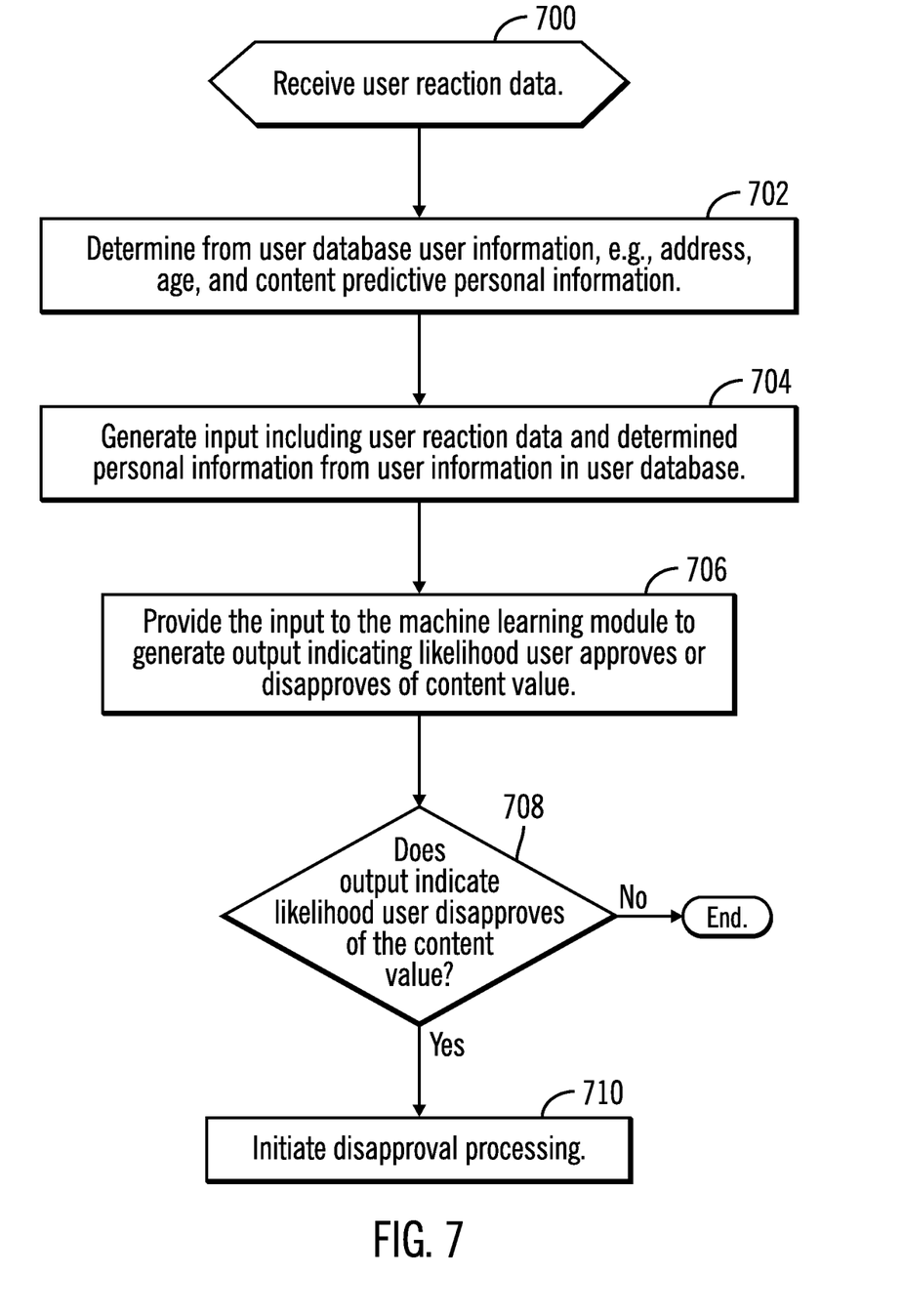
FIG. 7 illustrates an embodiment of operations to process user reaction data to provide input to a machine learning algorithm to determine whether a user approves or disapproves of content being gazed in the document.

FIG. 7 illustrates an embodiment of operations performed by the real-time content generator 128 upon receiving the user reaction data 200 from the real-time content interface 124. Upon receiving (at block 700) the user reaction data 200, the real-time content generator 128 determines (at block 702) from the user database 300 information for the indicated user 202, such as address 308, age 306, content predictive personal information 310 relevant to the content in the gazed section 206. The real-time content generator 128 generates (at block 704) input 500 including the user reaction data 200 and the determined personal information 304, 306, 308, 310 in fields 502, 504, 506, 508 of the input 500. The generated input 500 is provided (at block 706) to the machine learning module 132 to generate output 134 indicating a likelihood the user 112 approves or disapproves of the content value rendered in the section $110_i$ being gazed. If (at block 708) the output 134 indicates the user 112 likely disapproves of the rendered content value, then disapproval processing is initiated (at block 710). If (at block 708) the output 134 indicates the user likely approves of the rendered content value being gazed, then control ends, with the convent value left unchanged in the document 108.

With the embodiment of FIG. 7, gathered user biometric data, such as measured from body functions, a detected motion, emotions, etc., are provided as input 500 to a machine learning module 132 to provide an objective measurement predictive of whether the user 112 likely approves or disapproves of the content value upon which they are gazing.

Figure 8:
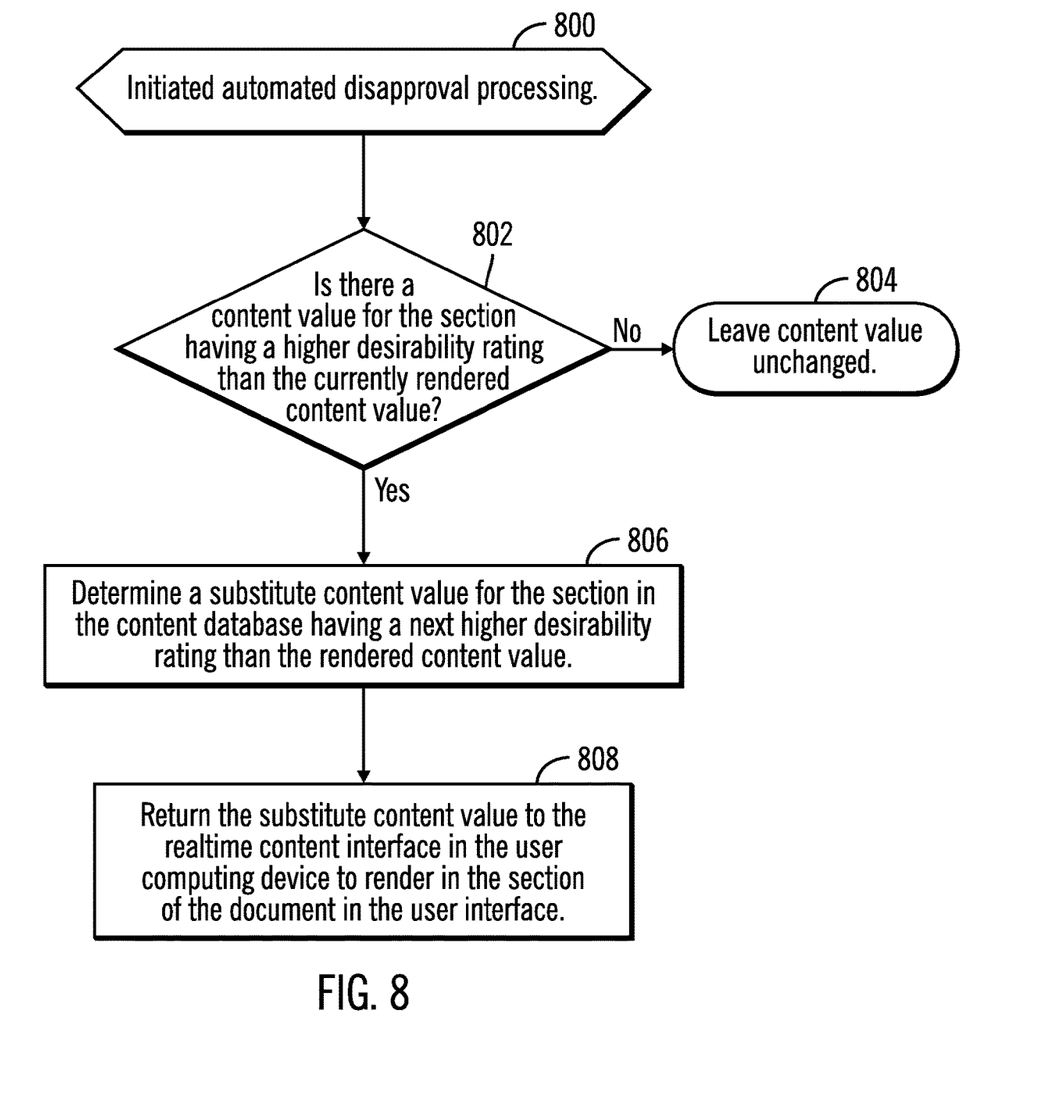
FIG. 8 illustrates an embodiment of operations to automatically determine a substitute content value for a gazed content value that the user is likely to disapprove.

FIG. 8 illustrates an embodiment of automated disapproval processing performed by the real-time content generator 128. Upon initiating (at block 800) the automated disapproval processing, the real-time content generator determines (at block 802) whether there is a content value $404_i$ for the gazed section 402 in the content database 400 having a higher user desirability rating $406_i$ than the desirability rating $406_j$ for the content value $404_j$ being rendered in the section 402. If (at block 802) there is no content value having a higher user desirability rating, then the content value $404_j$ being rendered in the user interface 106 is left unchanged (at block 804). If (at block 802) there is a content value $404_i$ having a higher user desirability rating $406_i$, e.g., $406_i$ is greater than $406_j$, then the real-time content generator 128 determines (at block 806) a substitute content value $404_i$ in the content database 400 for the section 206 being gazed having a next higher desirability rating $406_i$. The real-time content generator 128 returns (at block 808) the substitute content value $404_i$ to the real-time content interface 124 in the user computing device 100 to render in the section $110_i$ of the document 108 in the user interface 106.

With the embodiment of FIG. 8, the real-time content generator 128 automatically determines a new content value that has a higher user desirability rating than the current content value for which the user likely disapproves based on measured biometric data, including emotions and other measured bodily functions. By immediately substituting in real-time the content value that has a higher user desirability rating for a content value the user likely disapproves, the real-time content generator 128 is likely to gain the user's approval of the generated content in the document 108 to achieve the desired result, such as entice the user to purchase a product offered in the document 108, accept the terms of an offer, such as an offer of employment, related in the document 108, etc. Further, with the embodiment of FIG. 8, the likely disapproved of content value is substituted in real-time without requiring document administrator involvement to reduce user 112 dissatisfaction with the terms of the document 108 and achieve the desired result with the user 112.

Figure 9:
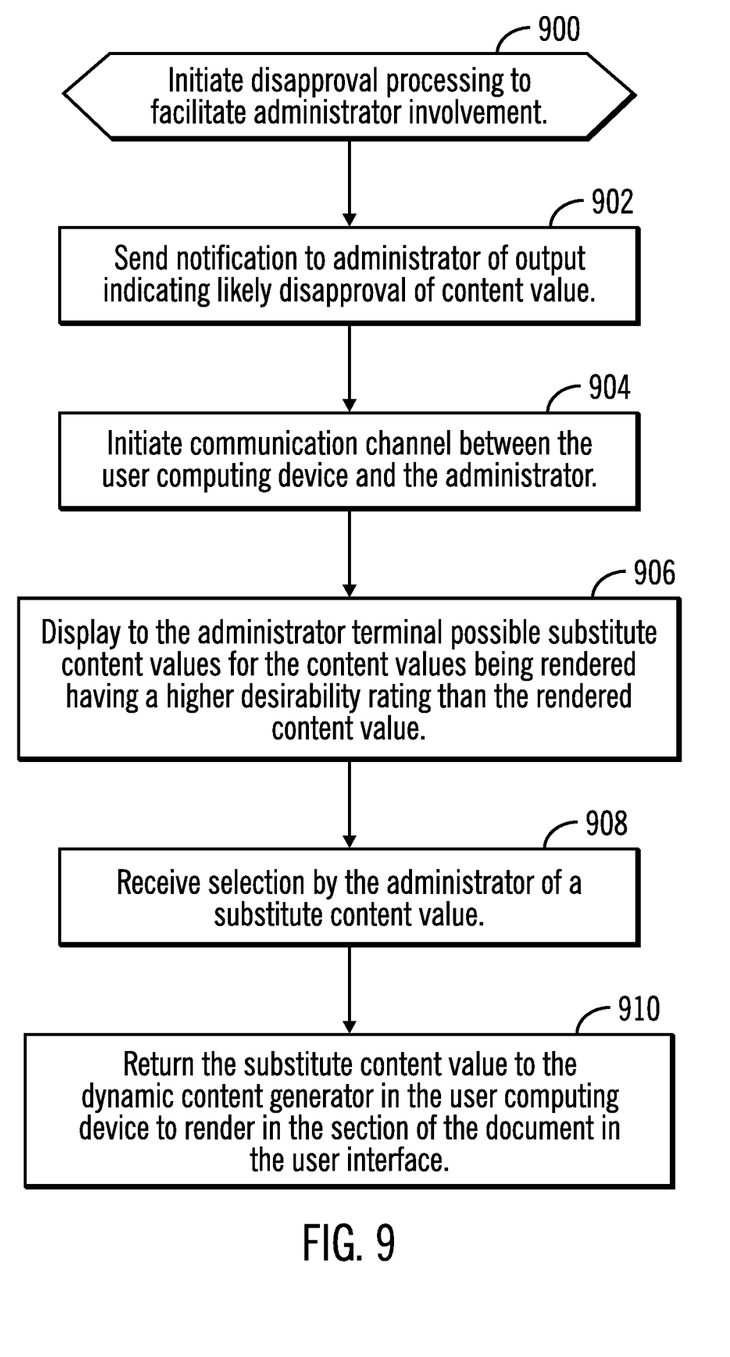
FIG. 9 illustrates an embodiment of operations to interact with an administrator terminal to determine a substitute content value for a gazed content value that the user is likely to disapprove.

FIG. 9 illustrates an embodiment of operations performed by the real-time content generator 128 to perform disapproval processing that facilitates involvement by a document administrator or document support personnel at an administrator terminal 136 to suggest a new substitute content value for the content value in the section being gazed by the user 112. Upon initiating (at block 900) the disapproval processing, the real-time content generator 128 sends (at block 902) notification to an administrator terminal 136 of output 134 indicating user 112 disapproval of a content value rendered in the document 108. The real-time content generator 128 may further automatically initiate (at block 904) a communication channel between the user computing device 100, including the user communication interface 126, and administrator terminal 136 to allow the document administrator to determine the extent to which the user 112 is dissatisfied with the content value being gazed. The real-time content generator 128 may further send (at block 906) to the administrator terminal 136 potential substitute content values $404_i$ for the content value $404_j$ being rendered, such as potential substitute content values having a higher desirability rating $406_i$ than the user desirability rating $406_j$ of the rendered content value $404_j$. Upon receiving (at block 908) document administrator selection of a content value to use as a substitute content value $404_i$ for the content value being rendered $404_j$, the real-time content generator 128 returns (at block 910) the substitute content value $404_i$ to the user computing device 100 to cause the real-time content interface 124 to display the received substitute content value $404_i$ in the document 108, replacing the content value $404_j$ indicated by the output 134 as likely disapproved of by the user 112.

With the embodiment of FIG. 9, the real-time content generator 128 provides a document administrator or document support personnel at an administrator terminal 136 information on a user 112 disapproved content value and potential substitute content values for the gazed section $110_i$ that the document administrator may select to include in the rendered document 108 for the user 112 to consider to increase the likelihood of retaining user satisfaction with the content values displayed in the document 108. Further, by providing the administrator with information on content values having a higher desirability rating, the administrator is more likely to select a content value the user 112 approves and achieve the desired result with respect to the user 112 accepting or approving of the content values in the document 108 as a whole, and take the action intended by the document.

Figure 10:
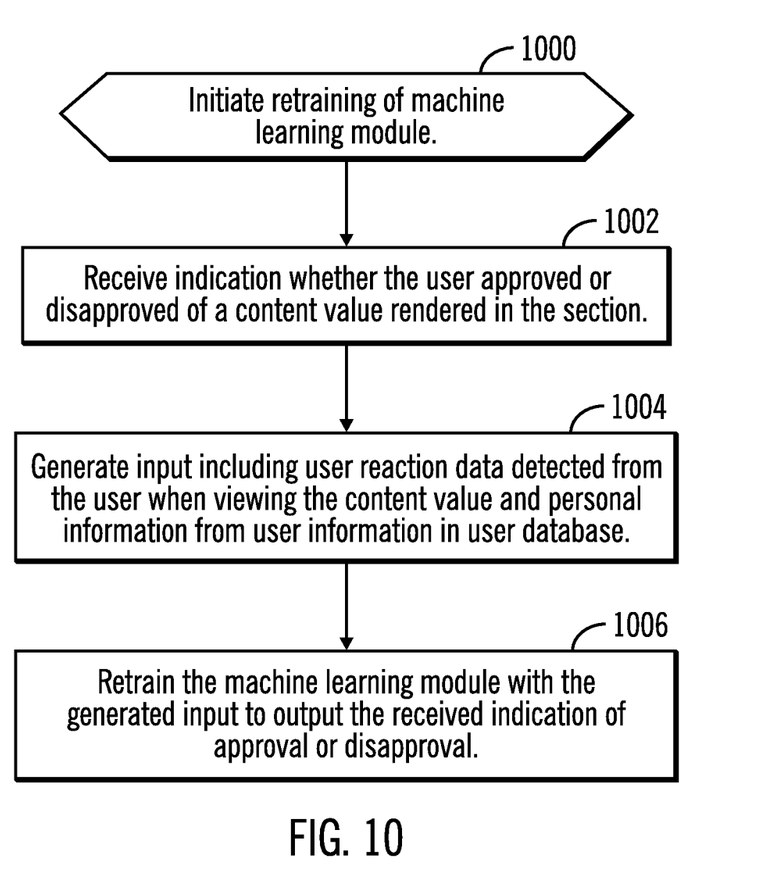
FIG. 10 illustrates an embodiment of operations to retrain a machine learning algorithm based on actual determined user approval and disapproval of content values rendered in a document.

FIG. 10 illustrates an embodiment of operations performed by the machine learning module 132 or other component to retrain the machine learning module 132 based on feedback from the user 112 as to their actual approval or disapproval of content values rendered in the sections $110_i$. Upon initiating (at block 1000) retraining, the machine learning module 132 receives (at block 1002) indication whether the user approved or disapproved of a content value rendered in a section $110_i$ of the document 108 Input 500 is generated (at block 1004) including the user reaction data 200 detected from the user 112 facial expressions and biometric data when viewing the content value and the personal information $300_i$ for the user 112 to include in fields 502, 504, 506, 508. The machine learning module 132 is retrained (at block 1006) with the generated input 500 to output 134 the received indication of approval or disapproval. The machine learning module 132 may be retrained using back propagation and other suitable machine learning retraining techniques.

With the embodiment of FIG. 10, the machine learning module is retrained to improve the accuracy of the predicted likelihood of user approval or disapproval based on the user reaction data and personal information to provide more optimized and accurate output 134.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
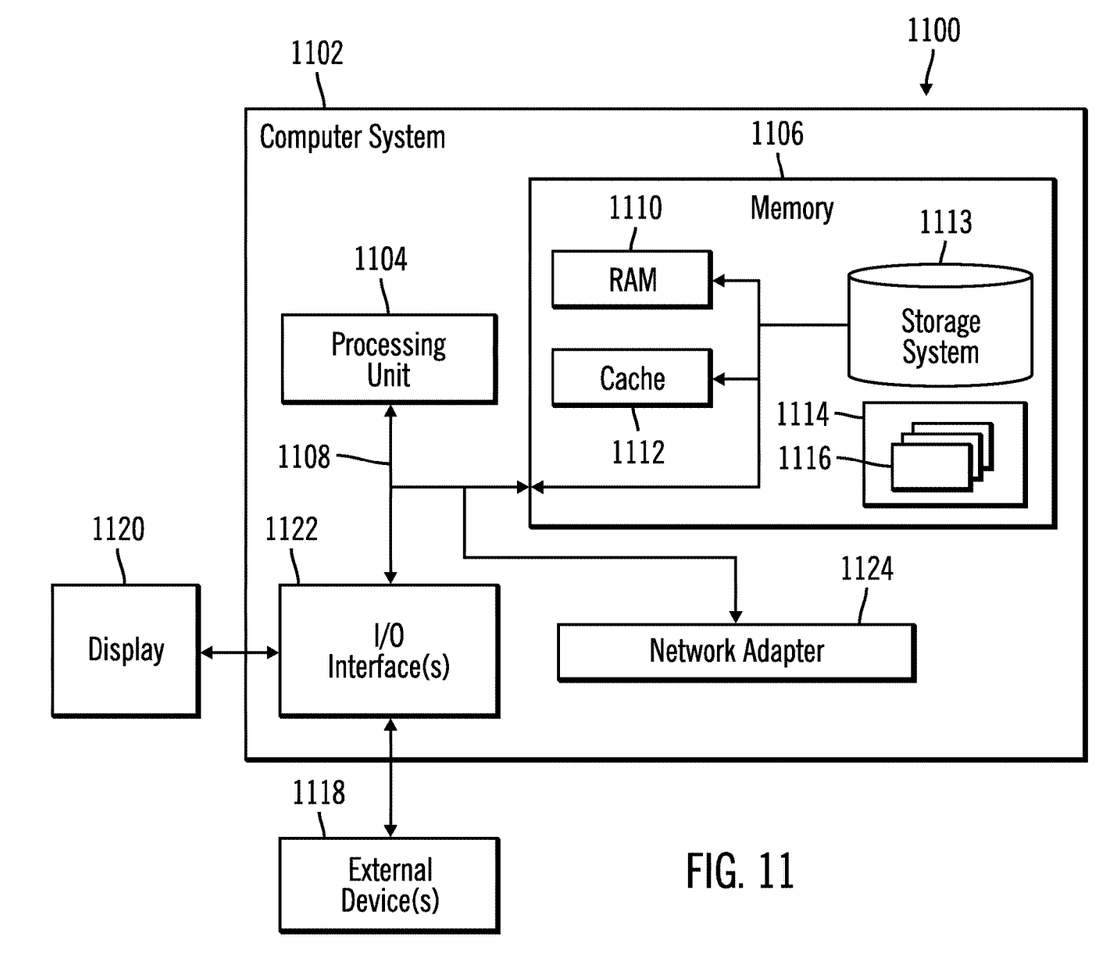
FIG. 11 illustrates a computing environment in which the components of FIG. 1 may be implemented

The computational components of FIG. 1, including the user computing device 100, content server 102, and administrator terminal 136, may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining displayed sections in a computer user interface to modify based on user feedback from a user reviewing the displayed sections, the computer program product comprising a computer readable storage medium having computer readable program code embodied therein that is executable to perform operations, the operations comprising:

providing a plurality of concurrently rendered sections in the computer user interface having rendered content values in the concurrently rendered sections;

maintaining section entry data structures for the concurrently rendered sections, wherein there is a different section entry data structure for each section of the concurrently rendered sections having substitutable content, wherein each section entry data structure of the section entry data structures indicate multiple content values to render in the section for which the section entry data structure provides content values and desirability ratings of the content values from a perspective of the user reviewing the concurrently rendered sections;

detecting a section of the concurrently rendered sections in the computer user interface that the user is observing, wherein a rendered content value rendered in the detected section that the user is observing is indicated in a section entry data structure for the detected section;

detecting, from a monitoring device, user biometric data;

determining personal information of the user;

providing as input to a machine learning module the rendered content value, the user biometric data, and the personal information of the user;

receiving as output, from the machine learning module, indication of likelihood that the user approved or disapproved of the rendered content value;

in response to the output indicating the user disapproved of the rendered content value, rendering in the detected section a substitute content value of a plurality of content values provided in the section entry data structure for the detected section having a higher desirability rating than a desirability rating of the rendered content value, wherein the substitute content value is substituted into the detected section in real-time while the user is viewing the concurrently rendered sections;

receiving indication from the user whether the user approved or disapproved of the rendered content value;

in response to receiving indication the user approved of the rendered content value, retraining the machine learning module to produce as output that the user likely approved the rendered content value for the input provided to the machine learning module for the rendered content value the user was observing including the user biometric data and the personal information of the user; and in response to receiving indication the user disapproved of the rendered content value, retraining the machine learning module to produce as output that the user likely disapproved of the rendered content value for the input provided to the machine learning module for the rendered content value the user was observing including the user biometric data and the personal information of the user.

2. The computer program product of claim 1, wherein the rendered content value is left unchanged in the section rendered in the computer user interface in response to determining that the output indicates the user will likely approve of the rendered content value.

3. The computer program product of claim 1, wherein the operations further comprise:

transmitting information, to an administrator computer, indicating that the user is likely to disapprove of the rendered content value in response to determining that the output indicates the user will likely disapprove of the rendered content value;

receiving, from the administrator computer, the substitute content value; and sending the substitute content value for the section to the computer user interface to render in the section.

4. The computer program product of claim 3, wherein the operations further comprise:

transmitting, to the administrator computer, content values of the plurality of content values for the section having a higher desirability rating than a desirability rating of the rendered content value the user will likely disapprove, wherein the substitute content value comprises one of the content values having the higher desirability rating sent to the administrator computer.

5. The computer program product of claim 3, wherein the operations further comprise:

initiating a communication channel between the user in the computer user interface and an administrator at the administrator computer over a network in response to determining that the output indicates the user will likely disapprove of the content value, wherein the substitute content value is transmitted following communication between the user and the administrator in the communication channel.

6. The computer program product of claim 1, wherein the monitoring device comprises a biometric monitoring device that measures bodily functions.

7. The computer program product of claim 1, wherein the operations further comprise:

processing input from a video camera to determine a location in the computer user interface gazed by the user; and determining whether the location gazed by the user comprises one of the concurrently rendered sections having one of a plurality of content values for the section, wherein the detecting the user is observing the section is detected in response to determining that the location the user is gazing comprises the section.

8. The computer program product of claim 7, wherein the monitoring device comprises the video camera, wherein the operations further comprise:

processing input from the video camera to determine user emotion in response to detecting the user is observing the detected section, wherein the user biometric data included in the input to the machine learning module comprises the determined user emotion.

9. A system for determining sections displayed in a computer user interface to modify based on user feedback from a user reviewing the displayed sections, comprising:

a processor; and a computer readable storage medium having computer readable program code embodied therein that when executed by the processor performs operations, the operations comprising:

providing a plurality of concurrently rendered sections in the computer user interface having rendered content values in the concurrently rendered sections;

maintaining section entry data structures for the concurrently rendered sections, wherein there is a different section entry data structure for each section of the concurrently rendered sections having substitutable content, wherein each section entry data structure of the section entry data structures indicate multiple content values to render in the section for which the section entry data structure provides content values and desirability ratings of the content values from a perspective of the user reviewing the concurrently rendered sections;

detecting a section of the concurrently rendered sections in the computer user interface that the user is observing, wherein a rendered content value rendered in the detected section that the user is observing is indicated in a section entry data structure for the detected section;

detecting, from a monitoring device, user biometric data;

determining personal information of the user;

providing as input to a machine learning module the rendered content value, the user biometric data, and the personal information of the user;

receiving as output, from the machine learning module, indication of likelihood that the user approved or disapproved of the rendered content value; and in response to the output indicating the user disapproved of the rendered content value, rendering in the detected section a substitute content value of a plurality of content values provided in the section entry data structure for the detected section having a higher desirability rating than a desirability rating of the rendered content value, wherein the substitute content value is substituted into the detected section in real-time while the user is viewing the concurrently rendered sections;

receiving indication from the user whether the user approved or disapproved of the rendered content value;

in response to receiving indication the user approved of the rendered content value, retraining the machine learning module to produce as output that the user likely approved the rendered content value for the input provided to the machine learning module for the rendered content value the user was observing including the user biometric data and the personal information of the user; and in response to receiving indication the user disapproved of the rendered content value, retraining the machine learning module to produce as output that the user likely disapproved of the rendered content value for the input provided to the machine learning module for the rendered content value the user was observing including the user biometric data and the personal information of the user.

10. The system of claim 9, wherein the operations further comprise:

transmitting information, to an administrator computer, indicating that the user is likely to disapprove of the rendered content value in response to determining that the output indicates the user will likely disapprove of the rendered content value;

receiving, from the administrator computer, the substitute content value; and sending the substitute content value for the detected section to the computer user interface to render in the detected section.

11. The system of claim 9, wherein the operations further comprise:

processing input from a video camera to determine a location in the computer user interface gazed by the user; and determining whether the location gazed by the user comprises one of the concurrently rendered sections having one of a plurality of content values for the section, wherein the detecting the user is observing the section is detected in response to determining that the location the user is gazing comprises the section.

12. The system of claim 11, wherein the monitoring device comprises the video camera, wherein the operations further comprise:

processing input from the video camera to determine user emotion in response to detecting the user is observing the detected section, wherein the user biometric data included in the input to the machine learning module comprises the determined user emotion.

13. A computer implemented method for determining sections displayed in a computer user interface to modify based on user feedback from a user reviewing the displayed sections, comprising:

providing a plurality of concurrently rendered sections in the computer user interface having rendered content values in the concurrently rendered sections;

maintaining section entry data structures for the concurrently rendered sections, wherein there is a different section entry data structure for each section of the concurrently rendered sections having substitutable content, wherein each section entry data structure of the section entry data structures indicate multiple content values to render in the section for which the section entry data structure provides content values and desirability ratings of the content values from a perspective of the user reviewing the concurrently rendered sections;

detecting a section of the concurrently rendered sections in the computer user interface that the user is observing, wherein a rendered content value rendered in the detected section that the user is observing is indicated in a section entry data structure for the detected section;

detecting, from a monitoring device, user biometric data;

determining personal information of the user;

providing as input to a machine learning module the rendered content value, the user biometric data, and the personal information of the user;

receiving as output, from the machine learning module, indication of likelihood that the user approved or disapproved of the rendered content value;

in response to the output indicating the user disapproved of the rendered content value, rendering in the detected section a substitute content value of a plurality of content values provided in the section entry data structure for the detected section having a higher desirability rating than a desirability rating of the rendered content value, wherein the substitute content value is substituted into the detected section in real-time while the user is viewing the concurrently rendered sections;

receiving indication from the user whether the user approved or disapproved of the rendered content value rendered in the detected section;

in response to receiving indication the user approved of the rendered content value, retraining the machine learning module to produce as output that the user likely approved the rendered content value for the input provided to the machine learning module for the rendered content value the user was observing including the user biometric data and the personal information of the user; and in response to receiving indication the user disapproved of the rendered content value, retraining the machine learning module to produce as output that the user likely disapproved of the rendered content value for the input provided to the machine learning module for the rendered content value the user was observing including the user biometric data and the personal information of the user.

14. The method of claim 13, further comprising:
transmitting information, to an administrator computer, indicating that the user is likely to disapprove of the rendered content value in response to determining that the output indicates the user will likely disapprove of the rendered content value;
receiving, from the administrator computer, the substitute content value; and
sending the substitute content value for the detected section to the computer user interface to render in the detected section.

15. The method of claim 13, further comprising:
processing input from a video camera to determine a location in the computer user interface gazed by the user; and
determining whether the location gazed by the user comprises one of the concurrently rendered sections having one of a plurality of content values for the section, wherein the detecting the user is observing the section is detected in response to determining that the location the user is gazing comprises the section.

16. The method of claim 15, wherein the monitoring device comprises the video camera, further comprising:
processing input from the video camera to determine user emotion in response to detecting the user is observing the detected section, wherein the user biometric data included in the input to the machine learning module comprises the determined user emotion.

\* \* \* \* \*